Figure 1:
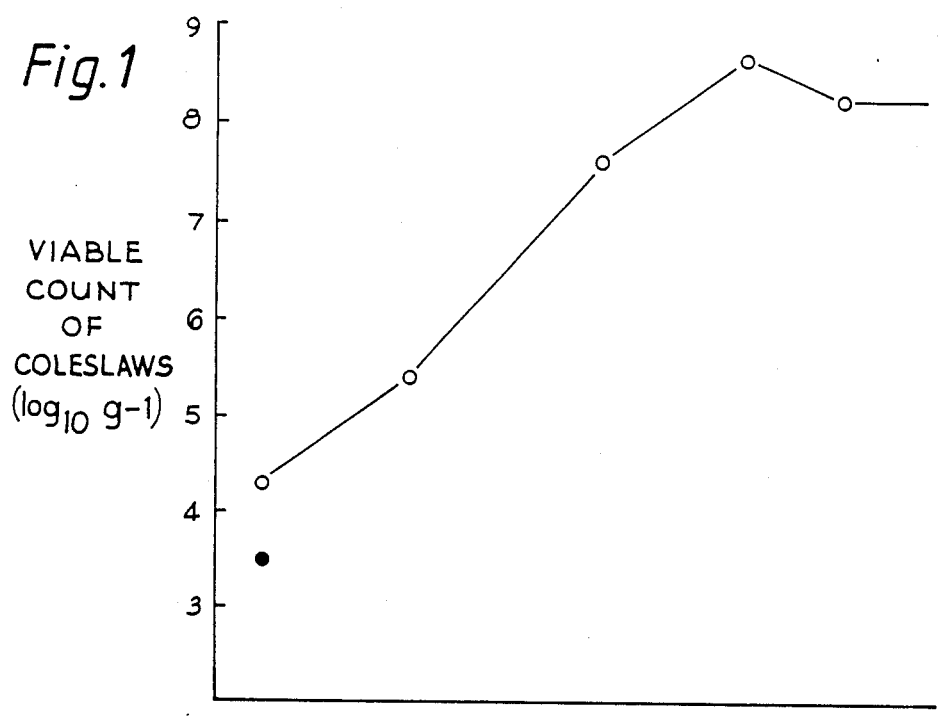
Figure 1:
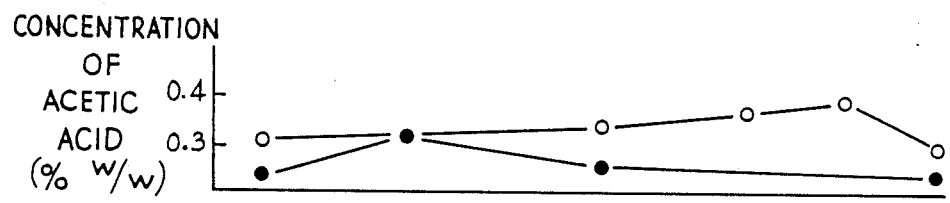
Figure 1:
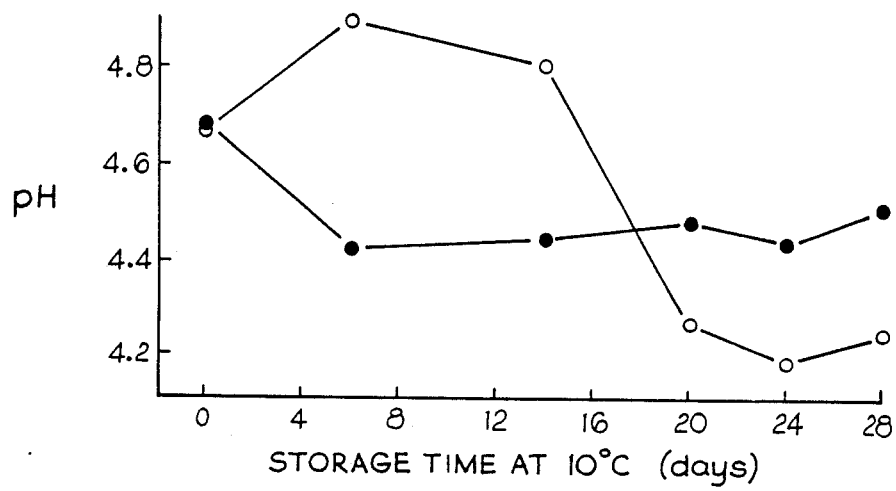

United States Patent [19]
Kirsop et al.

[11] Patent Number: 4,837,037
[45] Date of Patent: Jun. 6, 1989

[54] METHOD FOR IMPROVING THE SHELF LIFE OF A FOODSTUFF

[75] Inventors: Brian H. Kirsop, Ely; Timothy F. Brocklehurst, Norfolk, both of England

[73] Assignee: Agricultural & Food Research Council, Norwich, England

[21] Appl. No.: 67,607

[22] Filed: Jun. 26, 1987

[30] Foreign Application Priority Data

Jul. 3, 1986 [GB] United Kingdom ............... 8616246

[51] Int. Cl.$^4$ .......................... A23B 7/16; A23P 1/08
[52] U.S. Cl. .................................. 426/303; 426/102; 426/310; 426/575; 426/615
[58] Field of Search ................ 426/615, 102, 575, 90, 426/302, 310, 303

[56] References Cited

U.S. PATENT DOCUMENTS

| 2,611,708 | 9/1952 | Owens et al. | |
| 3,865,962 | 2/1975 | Earle | |
| 4,066,796 | 1/1978 | McKee | |
| 4,375,481 | 3/1983 | Kuwabara et al. | 426/573 |
| 4,386,108 | 5/1983 | Richter | 426/102 |
| 4,504,504 | 3/1985 | Gaehring et al. | 426/615 |

FOREIGN PATENT DOCUMENTS

| 48-31908 | 10/1973 | Japan | 426/102 |
| 0553755 | 1/1980 | Japan | 426/102 |
| 9210863 | 11/1984 | Japan | 426/575 |
| 1055373 | 1/1967 | United Kingdom | |
| 2172183A | 9/1986 | United Kingdom | |

OTHER PUBLICATIONS

T. R. Andrew and W. C. MacLeod, "Application and Control of the Algin-Calcium Reaction;" Food Product Development, Aug.-Sep. 1970.

Primary Examiner—Donald E. Czaja
Assistant Examiner—Mary S. Mims
Attorney, Agent, or Firm—Poms, Smith, Lande & Rose

[57] ABSTRACT

A method of treating an edible tissue to improve its shelf life which comprises contacting the tissue with a liquid treating agent comprising an inert carrier, preferably an ester of alginic acid, and a food grade organic acid, preferably acetic acid. In a particular method according to the invention the tissue is treated with a second agent comprising alginic acid to form a material capable of encapsulating the tissue.

30 Claims, 1 Drawing Sheet

METHOD FOR IMPROVING THE SHELF LIFE OF A FOODSTUFF

The present invention relates to a method of improving the shelf life of a foodstuff and in particular to a method of improving the shelf life of a foodstuff comprising an edible tissue and a liquid food component.

Mayonnaise based salads usually contain a range of ingredients of animal or vegetable origin in mayonnaise. The mayonnaise is an oil-in-water emulsion which usually contains acetic acid. The shelf life of these salad products is typically 6-14 days at a recommended temperature of 4°-6° C.

It has been found that the physical properties of these salads are not stable and many of their characteristics begin to change immediately after mixing the solid ingredients of the salad with the mayonnaise causing a deterioration of the salad. The deterioration is usually manifested in two forms: first, there is a change in the organoleptic properties which is evidenced by an alteration in the appearance of the vegetable tissue and a thinning of the mayonnaise; second, spoilage microorganisms develop.

Both forms of deterioration occur as a result of the redistribution of the components in the mayonnaise. Acetic acid present in the mayonnaise is taken up by the vegetable tissue and water passes from the vegetable tissue into the mayonnaise. In addition, oil or a dispersion of oil in mayonnaise may pass into the air spaces of the vegetable tissue. These redistributions usually occur within 24 hours of mixing the ingredients.

The transfer of oil into the vegetable tissue causes the previously white and opaque tissue to become translucent. The resulting tissue is often described as "tired", "aged", "translucent" and "grey". Furthermore, the migration of water into the mayonnaise and of oil into the vegetable tissue cause the texture of the mayonnaise to alter so that it becomes less viscous and runs off the vegetable tissue to expose it. In addition, the flavour and the creamy-oily mouthfeel of the mayonnaise are said to become weaker.

Although the migration of components is usually complete within 24 hours of manufacture, it has been found that the deterioration of the salad continues throughout its storage life. As the mayonnaise runs off the vegetable tissue, the translucent vegetable tissue becomes a progressively more obvious indicator of a deteriorating product.

Microbial spoilage is another factor influencing the shelf life of mayonnaise based salads. The mayonnaise contains acetic acid which, at the relatively low pH values and at the concentrations usually employed, is able to kill most microorganisms commonly found in salads and thus provide protection from microbiological spoilage or the growth of food poisoning bacteria. However, the migration of acetic acid into the vegetable tissue causes the concentration of the acetic acid in the mayonnaise to decrease which result in a concomitant rise in the pH of the mayonnaise. This reduces the protection offered by the mayonnaise and permits the growth of certain bacteria and yeasts which can lead to microbiological spoilage of the salad product. The spoilage organisms are introduced predominantly with the vegetable ingredients of the salad.

It is an object of this invention to provide a method for improving the shelf life of a foodstuff.

It is a further object of this invention to provide a method and a solution for treating the vegetable component of a mayonnaise based salad to increase the shelf life of the salad.

In accordance with the present invention there is provided a method of treating an edible tissue to improve its shelf life which comprises contacting the tissue with a liquid treating agent comprising an inert carrier and a food grade organic acid.

Said liquid treating agent may also comprise a cation suitable for use in food especially a divalent cation such as $Ca^{++}$.

A suitable inert carrier is an ester of alginic acid, for example a propylene glycol ester. One particular suitable ester is available commercially under the designation L25A. The presence of the inert carrier in the solution serves to improve the loading of the tissue with cations, especially where the tissue is of a hydrophobic nature, such as cabbage leaf tissue.

The effectiveness of the first solution can be further improved by incorporating a surfactant. Suitable food grade surfactants include sucrose esters such as sucrose palmitate and sucrose stearate. A suitable ester is a sucrose palmitate ester available commercially under the designation P1570.

Said liquid treating agent may also comprise lactate ions.

The cations may be provided in the solution by the addition of a carboxylic acid salt of the cation. Where the cation is $Ca^{++}$ the cations may be added in the form of calcium lactate.

Said liquid treating agent is utilized to provide a microbicidal effect to the tissue being treated. It has been found that this can be achieved by the incorporation of the food grade organic acid, for example carboxylic acids such as acetic acid, lactic acid, citric acid, tartaric acid or sorbic acid.

Said liquid treating agent may be applied to the tissue in any convenient way but it is preferably applied as a dip. After dipping the tissue is drained and the residual liquid treating agent allowed to contact the tissue for a period of time sufficient to effect a decrease in the numbers of microorganisms. A period of about 30 minutes is usually adequate.

The concentration of the inert carrier in said liquid treating agent should be within the range of 0.5 to 10% (w/w) and preferably within the range of 1 to 4% (w/w). More preferably, the concentration of the inert carrier in said liquid treating agent is 2% (w/w).

The concentration of the food grade cation in said liquid treating agent should be within the range of 0.5 to 10% (w/w) and preferably within the range of 1 to 5% (w/w) and preferable the concentration of the food grade cation in said liquid treating agent is 2.5% (w/w).

The concentration of the food grade organic acid in said liquid treating agent may be in the range of 0.5 to 10% (w/w) and, preferably, in the range of 0.5 to 4% (w/w). More preferably, the concentration of the food grade organic acid in said liquid treating agent is in the range of 1 to 2% (w/w).

The concentration of the food grade surfactant may be in the range of 0.1 to 4% (w/w) and preferably, in the range of 0.2 to 1% (w/w). More preferably, the concentration of the food grade surfactant in said liquid treating agent is 0.5% (w/w).

The concentration of lactate ions in said liquid treating agent should be within the range of 0.5 to 10%

(w/w). More preferably, the concentrations of lactate ions is 0.5% (w/w).

The method may also comprise treating the tissue with a second liquid treating agent to react with the food grade cations to form a material capable of encapsulating the tissue, said second agent comprising alginic acid.

The second liquid treating agent may be an aqueous solution comprising an alginic acid. A suitable alginic acid is available commercially under the designation LF5/60.

The material capable of encapsulating the tissue is preferably an alginate formed from alginic acid and from said cations suitable for use in food.

Treating the tissue with said liquid treating agent may serve to load the tissue with cations. Treating the loaded tissue with said second liquid treating agent, which may react with the cations to produce the encapsulating material, is an effective way of bonding the alginate to the tissue.

The concentration of alginic acid in the second liquid treating agent should be within the range of 0.2 to 8% (w/w) and, preferably, in the range of 0.5 to 4% (w/w). More preferably, the concentration of the alginic acid in the second liquid treating agent is 1% (w/w).

The second liquid treating agent may be applied in any suitable manner but it is preferably applied as a fine spray.

The tissue may be treated with a third liquid treating agent to reinforce the strength of the alginate gel formed by the application of said liquid treating agents and said second liquid treating agent. The third liquid treating agent may be an aqueous solution comprising a food grade cation. The cation may be any food grade divalent cation and, preferably, is a food grade divalent calcium cation. The cation may be in the form of a salt which is preferably a lactate of the food grade cation.

The concentration of the cation in the third liquid treating agent may be within the range of 0.5 to 10% (w/w) and preferably within the range of 1 to 4% (w/w). More preferably, the concentration of the food grade cation in the third liquid treating agent is 2.5% (w/w).

The liquid treating agents may be sterilized by any convenient method for example by autoclaving, filter sterilization or irradiation prior to use.

The liquid food component may be an oil-in-water emulsion such as mayonnaise.

Where the foodstuff product contains an acid, for example acetic acid in coleslaw mayonnaise, the desired quantity of acid can be incorporated in the liquid treating agent or agents. The quantity of acetic acid added to the mayonnaise can then be reduced accordingly or possibly eliminated altogether.

It is an advantage of this invention that it provides a method whereby it is possible to delay the organoleptic changes of a foodstuff comprising an edible vegetable tissue and a liquid food component. Said method may also be used to delay the growth of microbila spoilage organisms in the foodstuff.

A further advantage of this invention is that, by delaying the organoleptic changes of, and the growth of microorganisms in the foodstuff, it provides a method of improving the shelf life of the foodstuff.

Reference is now made to the accompanying drawings, in which:

FIG. 1 represents amounts of microorganisms in coleslaw and the concentration of acetic acid and pH of the mayonnaise fraction of coleslaw manufactured by conventional means (O) or by using treated cabbage (●);

EXAMPLE

An aqueous solution comprising:
2% w/w alginate ester L25A; 1 or 2% w/w acetic acid;
2.5% w/w calcium lactate;
0.5% w/w sucrose palmitate ester
was applied by dipping the shredded cabbage in the solution. The solution was drained and residual solution remaining on the cabbage was allowed to remain in contact for thirty minutes. The alginate ester L25A was used as an inert carrier to load food grade divalent calcium cations onto the cabbage tissue. The treatment also provided a microbicidal agent (acetic acid) and a food grade surfactant (sucrose palmitate ester P1570) which is used to improve the coating of the cabbage tissue.

Table 1 represents the change in the number of viable microorganisms on shredded cabbage and carrot tissue during treatment with the first solution for thirty minutes.

TABLE 1

Change in the numbers of viable microorganisms on shredded cabbage and carrot tissue during treatment with a first solution for 30 min.

| Vegetable | viable count of untreated tissue ($g^{-1}$) | % decrease in viable count after contact for 30 min with the first solution which contained acetic acid at a concentration of: (% w/w) | | |
|---|---|---|---|---|
| | | 1 | 1.5 | 2 |
| cabbage | $4 \times 10^5$ | 98.9 | 99.7 | 99.6 |
| carrot | $9 \times 10^6$ | 99.3 | 97.3 | 98.1 |

A second solution comprising 1% w/w alginic acid LF5/60 was applied in the form of a fine spray to the shredded cabbage tissue. The alginic acid reacted with the divalent calcium cations to form calcium alginate gel.

A third solution comprising 2.5% w/w calcium lactate was applied in the form of a fine spray. The divalent calcium cations present in this solution reinforced the strength of the calcium alginate film encapsulating the shredded cabbage tissue by the initiation of a calcium precipitated gelation on the outer part of the alginic acid coat.

The experiment was carried out on coleslaw using a sample made from cabbage treated as above and an untreated sample. The sample containing the treated cabbage was made from mayonnaise repaired aseptically and which did not contain acetic acid. The concentration of acetic acid in the alginate ester L25A (1 or 2% w/w) was chosen to give a final concentration in the product, after equilibration, which was similar to or below that in products present on the market.

Conventional coleslaw was manufactured by mixing 750g of freshly shredded cabbage leaf tissue with 300g of conventional mayonnaise which contained acetic acid (Table 2). Treated coleslaw was manufactured by treating 750g cabbage leaf tissue by the standard procedure according to this invention and then mixing this with 300g mayonnaise which did not contain acetic acid.

TABLE 2

Composition of mayonnaises used in the manufacture of conventional and treated coleslaws.

| ingredient | % (w/w) in mayonnaise used in the manufacture of | |
|---|---|---|
| | conventional coleslaw | treated coleslaw |
| sunflower oil | 60 | 60 |
| egg yolk | 7 | 7 |
| sucrose | 8.2 | 8.2 |
| Na Cl | 1.5 | 1.5 |
| xanthan | 0.5 | 0.5 |
| acetic acid | 1.1 or 0.6 | 0 |
| water | to 100 | to 100 |

The coleslaws were distributed into commercial tubs, sampled throughout storage at 10° C. for 28 days and the number of viable microorganisms, the pH and the concentrations of acetic acid were measured and the general appearance noted.

(i) Conventional coleslaw: The cabbage tissue in this product changed in appearance from white opaque to translucent. After storage for 5 days, the additional deteriorative change of considerable brown colouration was noted. when the mayonnaise contained 0.3-0.4 % (w/w) acetic acid at pH 4.7-4.8, growth of lactobacilli and yeasts occurred in the product.

(ii) Treated coleslaw: The cabbage tissue in this product did not become translucent but retained its white opaque appearance and did not discolour. When the cabbage was treated with alginate ester L25A solution which contained 1% (w/w) acetic acid, coleslaw was produced in which the concentration of acetic acid in the mayonnaise was 0.2-0.3% (w/w) at pH 4.4-4.7. The numbers of viable microorganisms remained below $10^2 \, g^{-1}$.

The single figure of the accompanying drawings comprises 3 graphs showing the change in count of viable microorganisms, concentration of acetic acid, and pH with storage time in the mayonnaise fractions of coleslaw.

The numbers of viable microorganisms were determined on plate count agar incubated for 2 days at 25° C.

Coleslaws manufactured by conventional means are identified by (O) and treated cabbage by (●).

We claim:

1. A method of treating an edible tissue of a hydrophobic nature to improve the shelf life of said tissue, said method comprising contacting the tissue with a liquid treating agent for a period of time sufficient to effect a decrease in the number of micro-organisms in the tissue, said liquid treating agent being an aqueous solution comprising an ester of alginic acid and a food grade organic acid.

2. A method according to claim 1 in which the inert carrier is an ester of alginic acid.

3. A method according to claim 1 in which the food grade organic acid is acetic acid.

4. A method according to claim 1 in which the liquid treating agent further comprises lactate ions.

5. A method according to claim 1 in which the liquid treating agent further comprises a food grade surfactant.

6. A method according to claim 5 in which the food grade surfactant is a sucrose ester.

7. A method according to claim 4 in which the concentration of lactate ions is within the range of 0.5 to 10% (w/w).

8. A method according to claim 4 in which the concentrations of lactate ions is within the range of 1 to 5% (w/w).

9. A method according to claim 4 in which the concentration of lactate ions is 2.5% (w/w).

10. A method according to claim 5 in which the concentration of surfactant is within the range 0.1 to 4% (w/w).

11. A method according to claim 5 in which the concentration of surfactant is within the range of 0.2 to 1% (w/w).

12. A method according to claim 5 in which the concentration of surfactant is 0.5% (w/w).

13. A method according to claim 1 in which the concentration of the ester of alginic acid is in the range of 0.5 to 10% (w/w), and the concentration of food grade organic acid is within the range of 0.5 to 10% (w/w).

14. A method according to claim 1 in which the concentration of the ester of alginic acid is in the range of 1 to 4% (w/w) and the concentration of food grade organic acid is in the range of 0.5 to 4% (w/w).

15. A method according to claim 1 in which the concentration of the ester of alginic acid is 2% (w/w) and the concentration of food grade organic acid is in the range of 1 to 2% (w/w).

16. A method according to claim 1 in which the liquid treating agent comprises a food grade cation.

17. A method according to claim 16 in which the food grade cation is $Ca^{++}$.

18. A method to claim 16 in which the food grade cations are present in the solution as calcium lactate.

19. A method according to claim 16 in which the concentration of food grade cation is within the range of 0.5 to 10% (w/w).

20. A method according to claim 16 in which the concentration of food grade cation is within the range of 1 to 5% (w/w).

21. A method according to claim 16 in which the concentration of food grade cation is 2.5% (w/w).

22. A method according to claim 16 which comprises treating the tissue with a second liquid treating agent to react with the food grade cation to form a material capable of encapsulating the tissue, said second agent comprising alginic acid.

23. A method according to claim 22 in which the concentration of alginic acid is within the range of 0.2 to 8% (w/w).

24. A method according to claim 22 in which the concentration of alginic acid is within the range of 0.5 to 4% (w/w).

25. A method according to claim 22 in which the concentration of alginic acid is 1%.

26. A method according to claim 22 which comprises treating the tissue with a third liquid treating agent adapted to reinforce the encapsulating material, said third agent comprising a food grade cation.

27. A method according to claim 26 in which the food grade cation of the third liquid treating agent is $Ca^{++}$.

28. A method according to claim 26 in which the concentration of food grade cation is 0.5 to 10% (w/w).

29. A method according to claim 26 in which the concentration of food grade cation is within the range of 1 to 5% (w/w).

30. A method according to claim 26 in which the concentration of food grade cation is 2.5% (w/w).

* * * * *